(12) United States Patent
Bowcutt et al.

(10) Patent No.: US 8,989,592 B2
(45) Date of Patent: Mar. 24, 2015

(54) OPTICAL FIBER TRANSMISSION SYSTEM

(71) Applicant: ADVA Optical Networking SE, Martinsried (DE)

(72) Inventors: Roy Bowcutt, Johns Creek, GA (US); Sorin Tibuleac, Johns Creek, GA (US)

(73) Assignee: ADVA Optical Networking SE, Martinsried (DE)

( * ) Notice: Subject to any disclaimer, the term of this patent is extended or adjusted under 35 U.S.C. 154(b) by 276 days.

(21) Appl. No.: 13/726,080

(22) Filed: Dec. 22, 2012

(65) Prior Publication Data

US 2014/0177657 A1    Jun. 26, 2014

(51) Int. Cl.
| | |
|---|---|
| H04B 10/00 | (2013.01) |
| H04J 3/04 | (2006.01) |
| H04J 14/02 | (2006.01) |
| H04B 10/077 | (2013.01) |

(52) U.S. Cl.
CPC .......... *H04J 14/0201* (2013.01); *H04B 10/077* (2013.01)
USPC .................. 398/151; 398/16; 398/25; 398/31; 398/48; 398/63; 398/168; 370/535; 370/542

(58) Field of Classification Search
USPC ............ 370/535, 542; 398/16, 25, 28, 31, 48, 398/63, 151, 168
See application file for complete search history.

(56) References Cited

U.S. PATENT DOCUMENTS

2009/0097846 A1*   4/2009   Kozischek et al. .............. 398/20
2014/0177657 A1*   6/2014   Bowcutt et al. ................ 370/535

FOREIGN PATENT DOCUMENTS

| EP | 1 643 670 A2 | 4/2006 |
|---|---|---|
| EP | 2 487 831 A1 | 8/2012 |
| WO | 2008111772 A1 | 9/2008 |
| WO | 2010042808 A1 | 4/2010 |

OTHER PUBLICATIONS

European Search Report corresponding to European Application No. 13164186.2, mailed Sep. 3, 2014 (6 pages).

* cited by examiner

*Primary Examiner* — Benjamin H Elliott, IV
(74) *Attorney, Agent, or Firm* — Maginot, Moore & Beck, LLP (57) ABSTRACT

An optical fiber transmission system adapted to provide a remote passive identification of components deployed in said transmission system, wherein each component comprises an associated passive optical identification unit adapted to provide identification of a component type of the respective component on the basis of a received optical identification signature carried in an optical identification signal to said component.

26 Claims, 4 Drawing Sheets

OPTICAL FIBER TRANSMISSION SYSTEM

BACKGROUND

The invention relates to a method and a system to provide remote passive identification of components deployed in an optical fiber transmission system.

Optical fiber transmissions typically have a central office acting as a traffic hub for all telecommunication channels supported on the passive optical network. Further, the passive optical network comprises the network nodes which form the end points for the communication channels. Each remote node of the passive optical network can comprise a transponder or transceiver which terminates a data channel which originates or terminates in the central office at the other end of the optical link. The passive optical network add/drop optical filters are provided corresponding to each channel wavelength. These add/drop optical filters of the passive optical network can be placed at the same or at a different location as the transceivers of the remote nodes. The add/drop filter is spliced along the length of a network fiber of the passive optical network and forms an integral part of the passive optical network. The add/drop optical filters can remain in place during an operation lifetime of the passive optical network, while the transponders or transceivers of the remote nodes are added, removed or replaced according to the needs of the network operator at the remote locations. The network operator of the passive optical network needs to have access to inventory and topology information regarding components and modules available in the respective optical network at any point in time. While the equipment located at the remote nodes of the passive optical network can provide such inventory information, there is currently no method available to remotely detect the type of add/drop filters available in the passive optical network and their location along the network fiber of the passive optical network. Accordingly, network operators cannot determine a location of filters, in particular add/drop filters across such a conventional network. In conventional systems network operators rely on the installer to have connected the correct filter at each side and on inventory documentation manually entered or written by the respective installer. As a consequence, errors during installation can occur in this process and information, in particular inventory information concerning the add/drop filters can be lost. The only possible remedy involves dedicated visits by the network operator to the remote nodes or remote sites which is time-consuming and cumbersome for the respective network operator.

Filter networks with dedicated communication channels between the nodes such as an optical supervisory channel OSC can derive inventory information about filter placement provided that the filters are equipped with an ID chip. Further, this conventional network requires that an electrical power is available at the filter add/drop location. However, in a passive optical network PON most filters, in particular add/drop filters, are not provided with electrical power so that a network operator cannot retrieve inventory information regarding the filters, for instance via a dedicated communication channel such as an optical supervisory channel.

Accordingly, it is an object of the present invention to provide a system and a method that allows remote passive identification of channel add/drop filters deployed in an optical fiber transmission system.

SUMMARY OF THE INVENTION

The invention provides an optical fiber transmission system adapted to provide a remote passive identification of components deployed in said transmission system, wherein each component comprises an associated passive optical identification unit adapted to provide identification of a component type of the respective component on the basis of a received optical identification signature carried in an optical identification signal of said component.

In a possible embodiment of the optical fiber transmission system the optical identification signature is formed by an identification wavelength and/or by a signature pattern in the time or frequency domain.

In a possible embodiment of the optical fiber transmission system the deployed components to be identified comprise channel add/drop filter components each comprising as an identification unit a passive optical identification filter being adapted to identify a component type of the respective channel add/drop filter component on the basis of an identification wavelength of an optical identification signal carried to the channel add/drop filter component.

In a possible embodiment of the optical fiber transmission system said optical fiber transmission system comprises remote node transceivers each being adapted to transmit and receive an optical data signal having a predetermined channel wavelength, wherein the remote node transceivers are connected via optical fibers with a central office of said optical fiber transmission system by means of corresponding channel add/drop filter components each comprising an associated passive optical identification filter unit being adapted to identify a filter type of the respective channel add/drop filter component.

In a possible embodiment of the optical fiber transmission system according to the present invention the central office comprises a tunable identification transceiver having a tunable laser or at least one test signal generator adapted to generate an optical identification signal having a unique identification and operates outside the range of data transmission signals used for optical data signals transmitted at the predetermined channel wavelengths.

In a possible embodiment of the optical fiber transmission system according to the present invention each passive optical identification filter unit is copackaged with its associated channel add/drop filter components.

In a further possible embodiment of the optical fiber transmission system according to the present invention the passive optical identification filter unit associated with its respective channel add/drop filter component is adapted to pass all optical data signals transmitted at said predetermined channel wavelengths and all optical identification signals at the identification wavelengths except for the specific wavelength reserved for the filter type of the associated channel add/drop filter component.

In a further possible embodiment of the optical fiber transmission system according to the present invention the passive optical identification filter unit associated with its respective channel add/drop filter component is further adapted to loop the optical filter type identification signal having the identification wavelength associated with the filter type of the respective associated channel add/drop filter component back to the receiver of the identification transceiver of the central office.

In a further possible embodiment of the optical fiber transmission system according to the present invention the identification transceiver of the central office comprises an identification transmitter adapted to generate an optical identification signal with a component type identification wavelength and with an adjustable transmit power.

In a possible embodiment of the optical fiber transmission system the identification transceiver generates the signal using a tunable broadband or fixed wavelength source to generate a unique optical identification signal intended to match a component type of a remote component.

In a further possible embodiment of the optical fiber transmission system according to the present invention the identification transceiver of the central office is adapted to increase the transmit power of the optical filter type identification signal generated by the identification transmitter of said identification transceiver from a minimum transmit power level to a maximum transmit power level until an identification receiver of said identification transceiver detects a component type identification signal with a valid component type identification wavelength identifying an associated filter type of a corresponding component deployed in said optical fiber transmission system and being connected to said central office via an optical fiber.

In a further possible embodiment of the optical fiber transmission system according to the present invention if no optical component type identification signal with a valid component type identification wavelength is detected by said identification receiver of said identification transceiver even at the maximum transmit power level, the identification transceiver of the central office is adapted to output a corresponding notification message indicating that no component of the component type associated with the respective component type identification wavelength is deployed in the optical fiber transmission system.

In a further possible embodiment of the optical fiber transmission system according to the present invention if an optical component type identification signal with a valid component type identification wavelength is detected by the identification receiver of the identification transceiver of the central office at an adjusted transmit power level, the identification transceiver of the central office is adapted to output a corresponding notification message indicating that a component of the component type associated with the respective component type identification wavelength is deployed in the optical fiber transmission system.

In a further possible embodiment of the optical fiber transmission system according to the present invention the identification transceiver of the central office is adapted to modulate the optical component type identification signal having a component type identification wavelength with an individual bit sequence inserted in a frame and to determine a round trip propagation time of the respective frame elapsed since the frame has been transmitted by the identification receiver, propagates through a fiber to the identified component where it is looped back and propagates back through a fiber to the identification transceiver of the central office.

In a further possible embodiment of the optical fiber transmission system according to the present invention the identification transceiver is adapted to derive a distance between the location of the identification transceiver of the central office and the location of the identified component from the determined round trip propagation time of the frame.

In a further possible embodiment of the optical fiber transmission system according to the present invention the identification transceiver of the central office is connected to a programmable bit sequence generation unit which generates an individual bit sequence inserted in a frame.

In a further possible embodiment of the optical fiber transmission system according to the present invention the programmable bit sequence generation unit is a FPGA, a processor, or a DSP controlled generation unit connected to an identification transceiver of the central office.

In a further possible embodiment of the optical fiber transmission system according to the present invention the central office comprises data transceivers adapted to transmit and receive optical data signals at different channel wavelengths.

In a further possible embodiment of the optical fiber transmission system according to the present invention the data transceivers of the central office are connected to a multiplexing unit adapted to multiplex the transmitted optical data signals onto an optical fiber being connected to an optical combining filter which is adapted to combine the multiplexed transmitted optical data signals with the optical filter type identification signals provided by the tunable identification transceiver of the central office.

In a further possible embodiment of the optical fiber transmission system according to the present invention the data transceivers of the central office are connected to a demultiplexing unit adapted to demultiplex optical data signals received via an optical fiber being connected to an optical extraction filter which is adapted to extract optical identification signals looped back by optical identification filters associated with components of the optical fiber transmission system to the central office.

The invention further provides a method for identifying remote components, in particular channel add/drop filters, deployed in an optical fiber transmission system comprising the steps of:

transmitting by an identification transceiver optical component type identification signals each having an identification wavelength associated with the corresponding component type within an identification wavelength range outside a data wavelength range used for optical data signals transmitted at predetermined channel wavelengths by an identification transceiver to remote components; and receiving by said identification transceiver optical signals which are evaluated to detect an optical component type identification signal having a valid component type identification wavelength looped back by a passive optical identification unit associated with a remote component to identify the component type of the respective associated remote component deployed in said optical fiber transmission system.

The invention further provides a component of an optical fiber transmission system comprising a passive optical identification unit which is adapted to provide an identification of a component type of the component by a remote identification transceiver of a central office by means of an identification signal having an identification signature associated with the respective component type of the component and looped back by the passive optical identification unit to the remote identification transceiver of the central office.

In a possible embodiment of the component according to the present invention the passive optical identification unit of said component is further adapted to provide a distance measurement between a location of the component and a location of the remote identification transceiver of the central office on the basis of a frame looped back by the passive optical identification filter unit of the component to the remote identification transceiver of the central office.

In a further possible embodiment of the component according to the present invention the passive optical identification filter unit is copackaged with the associated component.

In a possible embodiment the component is a channel add/drop filter component.

The invention further provides an identification transceiver adapted to identify remote components in an optical fiber transmission system, said identification transceiver comprising an identification transmitter adapted to generate and transmit optical component type identification signals each having an identification wavelength associated with a corresponding component type of a component; and an identification receiver adapted to receive optical signals to evaluate received optical signals to detect an optical component type identification signal having a valid component type identification signature looped back by a passive optical identification unit associated with a component to identify the component type of the respective associated channel component deployed in said optical fiber transmission system.

The invention further provides a central office of an optical transmission fiber system comprising at least one identification transceiver adapted to identify remote components in an optical fiber transmission system, said identification transceiver comprising an identification transceiver adapted to generate and transmit optical component type identification signals each having an identification signature associated with a corresponding component type of a component; and an identification receiver adapted to receive optical signals to evaluate received optical signals to detect an optical component type identification signal having a valid component type identification signature looped back by a passive optical identification unit associated with a component to identify the component type of the respective associated component deployed in said optical fiber transmission system, wherein said central office of the optical transmission fiber system further comprises data transceivers adapted to transmit and receive optical data signals at different channel wavelengths being connected to a multiplexing unit adapted to multiplex transmitted optical data signals onto an optical fiber being connected to an optical combining filter which is adapted to combine the multiplexed transmitted optical data signals with the optical identification signals provided by the identification transceiver of the central office.

In a further possible embodiment of the central office according to the present invention the data transceivers of the central office are connected to a demultiplexing unit adapted to demultiplex the received optical data signals received via an optical fiber being connected to an optical extraction filter which is adapted to extract optical identification signals looped back by optical identification filter units associated with components of the optical fiber transmission system to the central office.

DETAILED DESCRIPTION

Figure 1:
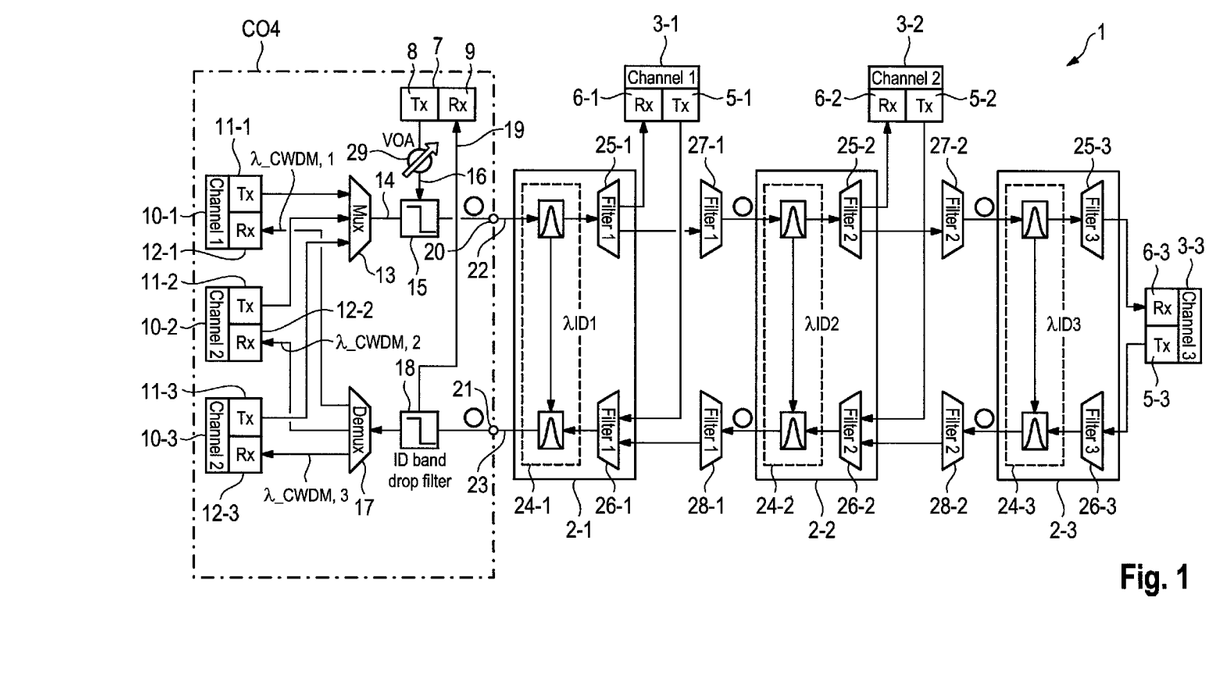
FIG. 1 shows a block diagram of a possible implementation of an optical fiber transmission system according to the present invention.

As can be seen from FIG. 1 the optical fiber transmission system 1 comprises in the shown implementation of FIG. 1 as components add/drop filters 2-1, 2-2, 2-3 at different remote nodes 3-1, 3-2, 3-3 connected to a central office 4 via optical fibers. At least some of the components 2-i located remote to central office 4 comprise an associated passive optical identification unit adapted to provide identification of a component type of the respective component on the basis of a received optical identification signature carried in an optical identification signal to the component 2-i. The optical identification signature can be formed by an identification wavelength and/or by a signature pattern in the time or frequency domain.

In the embodiment shown in FIG. 1 the deployed remote components 2-i to be identified comprise channel add/drop filter components. Each add/drop filter component 2-i has an identification unit which can comprise a passive optical identification filter. This passive optical identification filter is adapted to identify a component type of the respective channel add/drop filter component 2-i on the basis of an identification wavelength of an optical identification signal carried to the channel add/drop filter component 2-i.

According to the implementation of FIG. 1 the optical fiber transmission system 1 comprises three remote nodes 3-1, 3-2, 3-3. The number of remote nodes 3-i connected to the central office 4 can vary. The optical fiber transmission system 1 comprises remote node transceivers for the different remote nodes 3-1, 3-2, 3-3 each being adapted to transmit and receive optical data signals in a predetermined channel wavelength $\lambda_{CH}$ associated with the respective remote node 3-i. Each remote node transceiver of a remote node 3-i comprises a transmitter 5-i and a receiver 6-i as shown in FIG. 1. The remote node transceivers consisting of the transmitter 5-i and the receiver 6-i are connected via optical fibers to the central office 4 of said optical fiber transmission system 1 by means of the corresponding channel add/drop filter components 2-1, 2-2, 2-3. Each channel add/drop filter component 2-1, 2-2, 2-3 comprises an associated passive optical identification filter 24-1, 24-2, 24-3 being adapted to identify the filter type of the respective channel add/drop filter 2-i. The passive optical identification filter 24-c can be copackaged with its associated channel add/drop filter 2-i as shown in the implementation of FIG. 1.

As can be seen in FIG. 1 the central office 4 comprises an identification transceiver 7. This identification transceiver 7 comprises a tunable laser adapted to generate an optical identification signal having as a unique identification signature an identification wavelength $\lambda_{ID}$ within a predetermined identification wavelength range. The identification wavelength range used by the identification transceiver 7 of the central office 4 is in a preferred embodiment outside a data wavelength range used for optical data signals transmitted at the channel wavelengths $\lambda_{CH}$.

The identification transceiver 7 of the central office 4 comprises an identification transmitter 8 and an identification receiver 9 as shown in FIG. 1. The identification transmitter 8 is adapted to generate an optical identification signal with a tunable component type identification wavelength $\lambda_{ID}$ and with an adjustable transmit power. The central office 4 further comprises data transceivers 10-1, 10-2, 10-3 with different data channels each using a different channel wavelength $\lambda_{CH}$. Each data transceiver 10-1 comprises a data transmitter 11-i and a data receiver 12-i as shown in FIG. 1. The data transceivers 10-i each comprising a transmitter 11-i and a receiver 12-c are adapted to transmit and receive optical data signals at different channel wavelengths $\lambda_{CH}$. The data transceivers 10-i are connected to a multiplexing unit 13 which is provided to multiplex optical data signals generated by the data transceivers 10-1, 10-2, 10-3 onto an optical fiber 14 which is connected to an optical combining filter 15 as shown in FIG. 1. The optical combining filter 15 is provided to combine the multiplexed transmitted optical data signals received via the optical fiber 14 with optical identification signals received from the identification transceiver 7 of the central office 4 via an optical fiber 16 as can be seen in FIG. 1.

Each data transceiver 10-i of the central office 4 is further connected to a demultiplexing unit 17 provided to demultiplex the received optical data signals received by the central office 4 via an optical fiber 21 to different receivers 12-i of the data transceivers 10-i within the central office 4. The demultiplexing unit 17 is connected at its input to the output of an optical extraction filter 18 which is provided to extract optical identification signals looped back by the optical identification filters 24-I deployed within the optical transmission system 1. The extracted optical identification signals are applied to the receiver 9 of the identification receiver 7 via an optical fiber 19 as shown in FIG. 1. The central office 4 comprises in the shown implementation a signal output 20 and a signal input 21. The signal output 20 of the central office 4 is connected via a first fiber span comprising an optical fiber 22 to a first add/drop filter component 2-1 as shown in FIG. 1. Further, a signal output of the add/drop filter component 2-1 is connected via a second fiber 23 of the first fiber span to the signal input 21 of the central office 4.

In the embodiment shown in FIG. 1 a first add/drop filter component 2-1 comprises a copackaged integrated passive optical identification filter 24-1 which allows an identification of the filter type of the respective channel add/drop filter component 2-1. The passive optical identification filter 24-1 associated with the channel add/drop filter component 2-1 is adapted to pass all optical data signals transmitted at the predetermined channel wavelengths and all optical identification signals at the identification wavelengths except for the specific wavelength $\lambda_{ID1}$ reserved for the filter or component type of the associated channel add/drop filter component 2-1 and to loop the optical filter type identification signal having the identification wavelength $\lambda_{ID1}$ associated with the filter type of the associated channel add/drop filter component 2-1 back to the receiver 9 of the identification transceiver 7 of the central office 4. The looped back filter type identification signal travels via the optical fiber 23 of the first fiber span connecting the central office 4 with the first add/drop filter 2-1 to the signal input 21 of the central office 4 and to the input of the extraction filter 18. The extraction filter 18 extracts the identification signal having the identification wavelength $\lambda_{ID1}$ and forwards it via the optical fiber 19 to the receiver 9 of the optical identification transceiver 7 of the central office 4. The optical identification transceiver 7 can generate a corresponding identification message indicating that an add/drop filter component of a filter type corresponding to the identification wavelength $\lambda_{ID1}$ is provided within the optical fiber transmission system 1. The add/drop filter component 2-1 comprises the copackaged optical identification filter 24-1 as well as a drop filter 25-1 and an add filter 26-1. The drop filter 25-1 drops a signal at a first channel wavelength $\lambda_{CH1}$ to the receiver 6-1 of the remote node 3-1 as shown in FIG. 1. A first data channel is established between the transmitter 5-1 of the first data transceiver 10-1 within the central office 4 and the receiver 6-1 of the remote node 3-1 having the first channel wavelength $\lambda_{CH1}$ to transport an optical data signal. Further, the add/drop filter component 2-1 comprises an add filter 6-1 to add a signal at the first channel wavelength $\lambda_{CH1}$ received from the transmitter 5-1 of the remote node 3-1 and forward it to the identification filter 24-1 and the signal input 21 of the central office 4 where it is sent to the receiver 12-1 of the first data transceiver 10-1 via the extraction filter 18 and the demultiplexing unit 17 of the central office 4.

As can be seen in FIG. 1 the add/drop component 2-1 comprises in the shown implementation three filters, i.e. the passive optical identification filter 24-1, the drop filter 25-1 and the add filter 26-1. All three filters 24-1, 25-1, 26-1 can be copackaged and can be formed by passive optical filters and do therefore not need any power supply.

The remaining signals at the other channel wavelengths such as $\lambda_{CH2}$, $\lambda_{CH3}$ are not dropped by the drop filter 25-1 of the first add/drop filter component 2-1 and forwarded further to other drop filters of the optical fiber system 1, wherein they can be filtered with other optical filters such as filter 27-1 located in another fiber span to reach the next add/drop filter component 2-2 as shown in FIG. 1. Further, the optical signal output by the second add/drop filter component 2-2 can pass through another optical passive filters 27-2 of the third fiber span as shown in FIG. 1.

Also the second add/drop filter component 2-2 comprises in the shown implementation an integrated copackaged identification filter 24-2 which extracts and loops back another identification signal with a different identification wavelength $\lambda_{ID2}$ identifying the component filter type of the add/drop filter component 2. The same applies to the third add/drop filter component 2-3 having a copackaged integrated identification filter 24-3 which extracts and loops back an identification signal with another identification wavelength $\lambda_{ID3}$ identifying the filter type of the third add/drop filter 2-3.

The optical fiber transmission system 1 according to the present invention does not only allow to identify the filter type of the respective add/drop filter components 2-i used within the system 1, but also a distance between the add/drop filter components 2-i and the location of the central office 4. The identification transceiver 7 of the central office 4 comprising the transmitter 8 is adapted to increase a transmit power of the optical fiber type identification signal generated by the identification transmitter 8 step by step from a minimum transmit power level to a maximum transmit power level until the identification receiver 9 of the identification transceiver 7 detects an optical filter type identification signal with a valid component type identification wavelength identifying an associated filter type of a corresponding channel add/drop filter 2-i deployed in said optical fiber transmission system 1 and being connected to the central office 4 via an optical fiber. If no optical component type identification signal with a valid component type identification wavelength is detected by the identification receiver 9 of said identification transceiver even at the maximum transmit power level, the identification transceiver 7 of the central office 4 can output a corresponding notification message indicating that no component such as an add/drop filter of the component type associated with the respective component type identification wavelength is deployed within the optical fiber transmission system 1.

In contrast, if an optical component type identification signal with a valid component type identification wavelength is detected by the identification receiver 9 of the identification transceiver 7 at an adjusted transmit power level, the identification transceiver 7 can output a corresponding notification message indicating that a component such as an add/drop filter component 2-i of the component type associated with the respective component type identification wavelength is indeed deployed in the optical fiber transmission system 1.

In a possible implementation of the optical fiber system 1 according to the present invention the identification transceiver 7 of the central office 4 is adapted to modulate an optical component type identification signal having a component type identification wavelength with an individual bit sequence inserted in a frame. The identification transceiver 7 is further adapted to determine a round trip propagation time of the respective frame elapsed since the frame has been transmitted by the identification transceiver 7, propagates through a fiber to the identified add/drop filter component 2-i within the system 1, where it is looped back and propagates through a fiber to the identification receiver of the identification transceiver 7 within the central office 4.

In a possible embodiment the identification transceiver 7 comprises a calculation unit which is adapted to derive a distance between the location of the identification transceiver 7 of the central office 4 and the location of the identified add/drop filter component 2-i from the determined round trip propagation time of the respective frame.

In a possible embodiment the identification transceiver 7 of the central office 4 is connected to a programmable bit sequence generation unit which generates an individual bit sequence inserted in the respective frame. This programmable bit sequence generation unit can be formed by an FPGA connected to the identification transceiver 7 of the central office 4. Accordingly, the central office 4 within the system 1 according to the present invention comprises an additional transceiver or transponder 7 placed at the central office 4 which is used for identification of remote add/drop filters such as CWDM add/drop filters. This transceiver 7 comprises a transmitter 8 with a tunable laser in a tuning range outside the spectral range used by the data traffic wavelengths. Specifically, in the case of CWDM, the tunable laser can have a wavelength above 1618 nm, wherein the highest wavelength is determined by the number of different identification filters which could potentially be used and by the bandwidth of these identification filters. For example, in the case of 16 different CWDM filters and using identification filters with bandwidths typical of 50 GHz operation yields a required tuning range of around 6 nm. In a possible implementation the tunable laser can be a DFB (Distributed Feedback Laser). Other transmitter sources with wider bandwidth can also be used. This is possible due to the low modulation rate required for the identification transmitter 8 which can be below 1 MHz. The transmitter 8 of the transceiver 7 has also the capability to adjust the transmitted power, either through electronic control of the laser source or with an external variable optical attenuator VOA 29 as shown in FIG. 1. The remote add/drop filter 2-i can be copackaged with a pair of additional three-port filters, which have a common port (add or drop), a port for adding or dropping the ID wavelength associated with this particular add/drop filter 2-i and a port for transmitting all other CWDM and all other ID wavelengths. In a possible implementation the identification filters can be copackaged with the add/drop filter components 2-i shown in FIG. 1. In a further possible implementation the identification filter 24-i can be a separate filter connected to the add/drop filter component 2-i.

Figure 2:
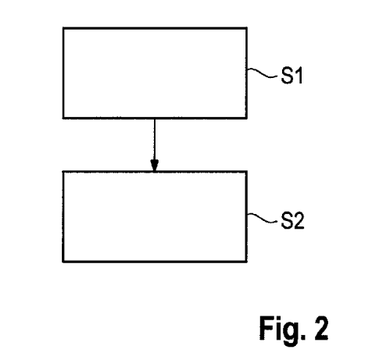
FIG. 2 shows a flow chart of a possible implementation of a method for identifying remote channel add/drop filters deployed in an optical fiber transmission system according to the present invention.

FIG. 2 shows a flow chart of a possible implementation of the method identifying remote channel add/drop filter components 2-i deployed in an optical fiber transmission system 1 according to a further aspect of the present invention.

In a step S1 an identification transceiver such as the identification transceiver 7 of the system 1 shown in FIG. 1 transmits integrated optical component type identification signals each having an identification wavelength associated with a corresponding component type within an identification wavelength range outside a data wavelength range used for optical data signals transmitted at predetermined channel wavelengths to remote components such as channel add/drop filters 2-i shown in FIG. 1.

In a further step S2 an identification transceiver receives optical signals which are evaluated to detect an optical component type identification signal having a valid component type identification wavelength looped back by a passive optical identification filter associated with a channel add/drop filter component to identify the filter type of the respective associated channel add/drop filter component deployed in the optical fiber transmission system.

Accordingly, the remote inventory information can be obtained by the central office 4 with a procedure as follows:

First, the identification transmitter 8 of the transceiver 7 of the central office 4 tunes the first of several (e.g. 16) possible wavelength values of identification wavelengths and sets the transmit power to its lowest setting to ensure that power is below a maximum admissible level at the receiver 9.

In a further step a FPGA or another programmable device of the identification transceiver 7 can generate a counter bit sequence which can be inserted in the payload of a standard Ethernet frame or within a different protocol frame. The modulation rate of this bit sequence can be determined by a desired accuracy for location of the CWDM filters deployed within the system.

The generated identification signal is combined with other CWDM wavelengths and transmitted along the network fiber. In a possible embodiment this process can occur prior to service turn-up and alternatively this process can be performed during network operation, since it does not interfere with data transmission through the traffic data channels.

The identification wavelength $\lambda_{ID1}$ is looped back by the passive identification filter 24-1 to the identification receiver 9 at the location of the remote node 2-1 which is equipped with the corresponding identification filter 24-1.

If the identification receiver does not detect a valid signal, it increases the transmit power step by step up to a maximum power level.

If a valid identification signal is not received even at a maximum transmit power a notification software message can be sent by the transceiver 7 to a higher layer operating software with the information that CWDM filter type 1 is not present in the network. The transmitter 8 of the transceiver 7 is then tuned to the next allowed identification wavelength.

If a valid identification signature is detected, the presence of a component of the associated component type in the optical network can be communicated to a higher level software. Furthermore, a FPGA can compare the timing offset of the received frame/counter to the transmitted frame/counter in order to derive the time elapsed since the frame was transmitted. The elapsed time is the round trip time for the transmitted frame/counter to travel to the filter and to return to the central office 4.

The timing offset between the transmitted and received frame/counter represents the fiber propagation latency which can be converted to a distance along the fiber from the central office 4.

The transmitter 8 of the identification transceiver 7 is then tuned to the next allowed identification wavelength and the previous steps are repeated for all identification wavelengths within the identification wavelength range.

The optical fiber transmission system 1 as shown in the implementation of FIG. 1 comprises a linear network configuration. Other possible implementations of the optical fiber transmission system 1 according to the present invention comprise a ring network with single or dual hubs (central offices) and diversely routed linear links. The implementation of FIG. 1 shows separate fibers used for transmit and receive direction of propagation for both CWDM and identification wavelengths. Other implementations of the optical fiber transmission system 1 are possible. For example, the CWDM channels use two fibers, while the identification wavelengths are transmitted and received on the same fiber. Further, it is possible that both CWDM and identification wavelengths use a single fiber for the transmit and receive direction.

The method and system according to the present invention comprises two aspects which can be used in conjunction to determine the type of the optical components 2-i as well as the distance along the fiber from the head end of the main office location where all data channels originate.

A first aspect of the present invention is to use an additional transmitter/receiver module, i.e. the identification transceiver 7 at the head end location where the identification transceiver 7 has a tunable wavelength with a tunability range outside the wavelength range used by the traffic channels. In addition, each component location is also equipped with an identification filter 24-i. This identification filter 24-i can be copackaged with the component 2-i and uniquely identify a particular component such as a channel add/drop filter. The identification filter 24-I further has transmission and reflection characteristics which are uniquely associated with a particular type of a component such as a channel add/drop filter. The identification filter 24-i within each component module or channel add/drop filter passes all traffic channels as well as all identification wavelengths originating from the tunable identification transmitter 8 except for the ID wavelength associated with this particular component.

A second aspect of the present invention is to modulate the identification transmitter source with a low frequency digital signal which can encode a clock counter into a frame such as an Ethernet or other protocol frame. The received signal is an optical signal which is converted to an electronic format and can be processed by an FPGA to determine a latency of the identification signal which has propagated to a particular identification filter and back to the central office 4. The latency is almost exclusively determined by the propagation delay through the fiber which allows an accurate measurement of the remote identification filter location. The identification transmitter can scan through a range of identification wavelengths which correspond to the range of allowed filter modules. FPGA can synchronize the transmitter wavelength scanning process with a latency measurement to distinguish the latency on different identification wavelengths.

With the method and system according to the present invention thus a network operator of a passive optical network PON can remotely retrieve information about a type of components 2-i and their respective location. Accordingly, the method and system according to the present invention allow to generate automatically inventory information about the components used in the optical fiber transmission system 1 even when no electrical power is available at the locations of the deployed components. The deployed identification filters comprise a unique signature defining the type of channel add/drop filter components 2-i deployed at said location so that no electrical power is necessary to identify the respective deployed filter component 2-i and its distance from the central office 4.

Figure 3:
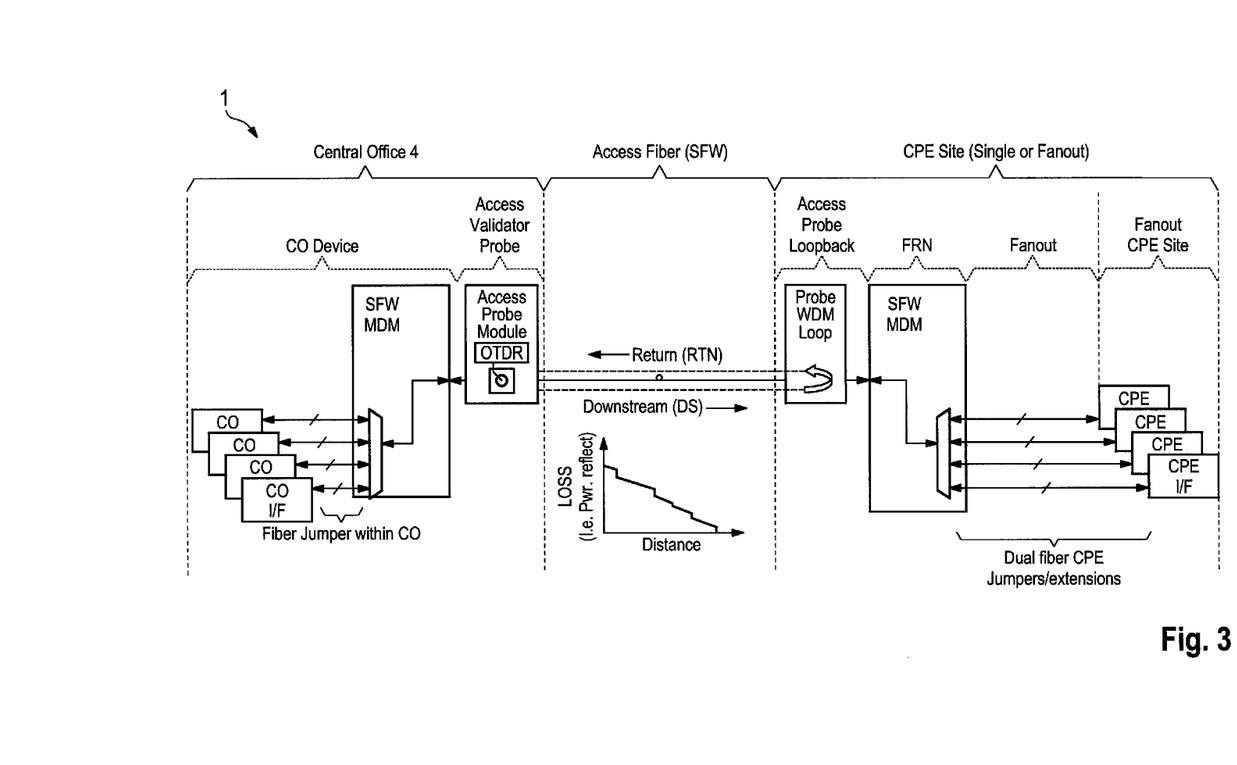
FIGS. 3, 4 show further possible embodiments of an optical fiber transmission system according to the present invention.

FIG. 3 shows a further possible embodiment of an optical fiber transmission system 1 according to the present invention. The optical transmission system 1 according to the present invention comprises in the shown embodiment a single fiber working, SFW, system, wherein multiple wavelength division multiplexing, WDM, transmission signals are transferred between the central office, CO, 4 and CPE sites. As shown in FIG. 1 the central office 4 comprises a single fiber working, SFW-MDM, having an integrated multiplexer to which data transceivers 10-i are connected. The central office 4 further comprises an access probe module. This access probe module can comprise a signal source that is used to create a test signal or an identification signal and transmit this signal down to an access fiber of the single fiber working SFW system. The test or identification signal is looped back at a remote single fiber working, SFW, multiplexing, demultiplexing unit by use of a tap and coupler. The looped back signal is then reflected back to the central office 4 and the access probe module as illustrated in FIG. 3. In the embodiment shown in FIG. 3 the looped back test or identification signal can be generated by a broadband laser source or by a superluminescent LED. The downstream test or identification signal can comprise a unique pattern or encoded sequence to uniquely identify a latency between transmitted and received timestamps. In a possible embodiment the correlation of the transmitted and received pattern is evaluated to determine a distance to the respective remote component. As shown in FIG. 3, at the CPE site the remote nodes with transceivers are connected to a single fiber working, SFW, MDM, comprising a multiplexing/demultiplexing unit. The CPE I/F or transceivers illustrated in FIG. 3 can be connected by dual fiber CPE jumpers/extensions to the multiplexing/demultiplexing unit within the SFW-MDM.

Figure 4:
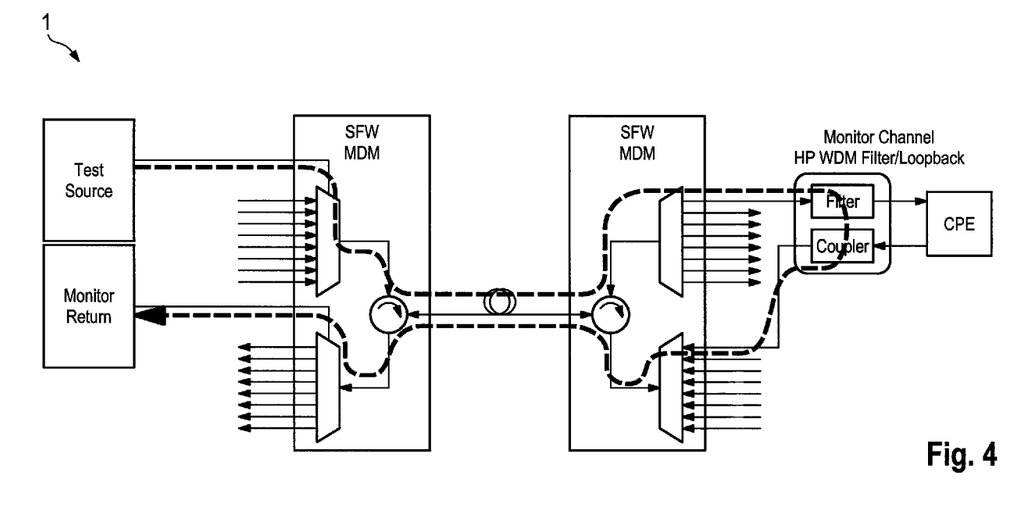

FIG. 4 illustrates a further possible embodiment of an optical fiber transmission system 1 according to the present invention. In the shown embodiment of FIG. 4 the optical fiber transmission system 1 comprises also a single fiber working, SFW, system and the detection of a remote CPE is performed through a SFW trunk. The dashed line in FIG. 4 shows the signal path taken by a test or identification signal through the optical fiber transmission system 1. The test or identification signal is generated by a test source. The test source initiates a signal downstream that passes through the single fiber working, SFW, trunk, a near-end SFW-MDM and a far-end SFW-MDM. The test or identification signal uses a wavelength or broadband source that is demultiplexed at the remote SFW-MDM and filtered to pass over the same remote access fiber link which is targeted for the respective test. In the embodiment shown in FIG. 4 a broadband source can be used which is remotely demultiplexed on several access fiber links. As shown in FIG. 4, near the CPE, a filter and coupler is provided which is adapted to uniquely identify the CPE and reflect a modified pattern back to the central office 4 comprising a monitoring unit to monitor the returned signal. In reflecting back a unique pattern, the remote filter and coupler shown in FIG. 4 can be uniquely identified in the central office 4. Further, a distance between the filter and coupler at the central office 4 can be calculated by the same latency measurement techniques as described in the context of the other embodiments.

What is claimed is:

1. An optical fiber transmission system comprising a processor with a memory operable to provide a remote passive identification of components deployed in said transmission system,
    wherein each component includes an associated passive optical identification unit operable to provide identification of a component type of the respective component on the basis of a received optical identification signature carried in an optical identification signal to said component, and
    wherein the deployed components to be identified includes channel add/drop filter components each comprising as an identification unit a passive optical identification filter being operable to identify a component type of the respective channel add/drop filter component on the basis of an identification wavelength of an optical identification signal carried to said channel add/drop filter component.

2. The optical fiber transmission system according to claim 1,
    wherein said optical identification signature is formed by an identification wavelength and/or by a signature pattern in the time or frequency domain.

3. The optical fiber transmission system according to claim 1, said optical fiber transmission system comprising remote node transceivers each being operable to transmit and receive an optical data signal having a predetermined channel wavelength, wherein the remote node transceivers are connected via optical fibers with a central office of said optical fiber transmission system by means of corresponding channel add/drop filter components each comprising an associated passive optical identification filter unit being operable to identify a component type of the respective channel add/drop filter component.

4. The optical fiber transmission system according to claim 3, wherein said central office comprises at least one test signal generator capable of generating an optical signal with an optical identification signal having an unique identification and operates outside the range of data transmission signals used for optical data signals transmitted at said predetermined channel wavelengths.

5. The optical fiber transmission system according to claim 4, wherein said identification transceiver of said central office includes an identification transmitter operable to generate an optical identification signal with a component type identification wavelength and with an adjustable transmit power.

6. The optical fiber transmission system according to claim 5, wherein said identification transceiver generates the signal using a tunable, broadband or fixed wavelength source to generate a unique optical identification signal intended to match a remote component type.

7. The optical fiber transmission system according to claim 6, wherein the tunable identification transceiver of the central office is operable to increase the transmit power of the optical component type identification signal generated by the identification transmitter of said identification transceiver from a minimum transmit power level to a maximum transmit power level until an identification receiver of said identification transceiver detects an optical component type identification signal with a valid component type identification wavelength identifying an associated component type of a corresponding component deployed in said optical fiber transmission system and connected to said central office via an optical fiber.

8. The optical fiber transmission system according to claim 7, wherein the identification transceiver of the central office is operable to output a corresponding notification message indicating that no component of the component type associated with the respective component type identification wavelength is deployed in the optical fiber transmission system, if no optical component type identification signal with a valid component type identification wavelength is detected by said identification receiver of said identification transceiver even at the maximum transmit power level.

9. The optical fiber transmission system according to claim 8, wherein the identification transceiver of the central office is operable to output a corresponding notification message indicating that a component of the component type associated with the respective component type identification wavelength is deployed in the optical fiber transmission system, if an optical component type identification signal with a valid component type identification wavelength is detected by the identification receiver of the identification transceiver at an adjusted transmit power level.

10. The optical fiber transmission system according to claim 6, wherein the identification transceiver of the central office is operable to modulate the optical component type identification signal having a component type identification wavelength with an unique bit sequence inserted in a frame and to determine a round trip propagation time of the respective frame elapsed since the frame has been transmitted by the identification transceiver, propagates through a fiber to the identified component where it is looped back and propagates back through a fiber to the identification transceiver of the central office.

11. The optical fiber transmission system according to claim 10, wherein the identification transceiver is operable to derive a distance between the location of the identification transceiver of the central office and the location of the identified component from the determined round trip propagation time of the frame.

12. The optical fiber transmission system according to claim 11, wherein the identification transceiver of the central office is connected to a programmable bit sequence generation unit which generates an individual bit sequence inserted in a frame.

13. The optical fiber transmission system according to claim 12, wherein the programmable bit sequence generation unit is a FPGA, a processor, or a DSP controlled generation unit connected to the identification transceiver of the central office.

14. The optical fiber transmission system according to claim 3, wherein each passive optical identification filter unit is copackaged with its associated Channel add/drop filter component.

15. The optical fiber transmission system according to claim 3, wherein the passive optical identification filter unit associated with its respective channel add/drop filter component is operable to pass all optical data signals transmitted at said predetermined channel wavelengths and all optical identification signals at the identification wavelengths except for the specific wavelength reserved for the component type of the associated channel add/drop filter component and to loop the optical filter type identification signal having the identification wavelength associated with the filter type of the respective associated channel add/drop filter component back to the receiver of the identification transceiver of the central office.

16. The optical fiber transmission system according to claim 1, wherein a central office includes data transceivers operable to transmit and receive optical data signals at different channel wavelengths.

17. The optical fiber transmission system according to claim 16, wherein the data transceivers of the central office are connected to a multiplexing unit operable to multiplex the transmitted optical data signals onto an optical fiber being connected to an optical combining filter which is operable to combine the multiplexed transmitted optical data signals with the optical component type identification signals provided by the tunable identification transceiver of the central office.

18. The optical fiber transmission system according to claim 16, wherein the data transceivers of the central office are connected to a demultiplexing unit operable to demultiplex optical data signals received via an optical fiber being connected to an optical extraction filter which is operable to extract optical identification signals looped back by optical identification filters associated with components of the optical fiber transmission system to the central office.

19. A method for identifying a remote component in an optical fiber transmission system, wherein an optical identification signal carrying an optical identification signature is transmitted to the remote component comprising an associated passive identification unit which provides an identification of a component type of the respective component on the basis of the optical identification signature, and wherein the remote component to be identified includes a channel add/drop filter component comprising as an identification unit a passive optical identification filter being operable to identify a component type of the respective channel add/drop filter component on the basis of an identification wavelength of an optical identification signal carried to said channel add/drop filter component.

20. A method for identifying remote components deployed in an optical fiber transmission system comprising the steps of:

(a) transmitting by an identification transceiver optical component type identification signals each having an identification wavelength associated with a corresponding component type within an identification wavelength range outside a data wavelength range used for optical data signals transmitted at predetermined channel wavelengths by an identification transceiver to remote components; and (b) receiving by said identification transceiver optical signals which are evaluated to detect an optical component type identification signal having a valid component type identification wavelength looped back by a passive optical identification unit associated with a remote component to identify the component type of the respective associated remote component deployed in said optical fiber transmission system.

21. A component of an optical fiber transmission system, said component comprising a passive optical identification unit which is operable to provide an identification of a component type of the component by a remote identification transceiver of a central office by means of an optical identification signal having an identification signature associated with the respective component type of the component and looped back by the passive optical identification unit to the remote identification transceiver of the central office.

22. The component according to claim 21,
wherein said passive optical identification unit of said component is further operable to provide a distance measurement between a location of the component and a location of the remote identification transceiver of a central office on the basis of a frame looped back by the passive optical identification unit of the component to the remote identification transceiver of the central office.

23. The component according to claim 21,
wherein the component comprises an add/drop filter component having a passive optical identification filter unit which is copackaged with the associated channel add/drop filter component.

24. An identification transceiver operable to identify remote components in an optical fiber transmission system, said identification transceiver comprising an identification transmitter operable to generate and transmit optical component type identification signals each having an identification signature associated with a corresponding component type of a component; and an identification receiver operable to receive optical signals to evaluate received optical signals to detect an optical component type identification signal having a valid component type identification signature looped back by a passive optical identification unit associated with a component to identify the component type of the respective associated component deployed in said optical fiber transmission system.

25. A central office of an optical fiber transmission system comprising:

at least one identification transceiver operable to identify remote components in an optical fiber transmission system, including (i) an identification transmitter operable to generate and transmit optical component type identification signals each having an identification signature associated with a corresponding component type of a component, and (ii) an identification receiver operable to receive optical signals to evaluate received optical signals to detect an optical component type identification signal having a valid component type identification signature looped back by a passive optical identification unit associated with a component to identify the component type of the respective associated component deployed in said optical fiber transmission system; and data transceivers operable to transmit and receive optical data signals at different channel wavelengths being connected to a multiplexing unit operable to multiplex transmitted optical data signals onto an optical fiber being connected to an optical combining filter which is operable to combine the multiplexed transmitted optical data signals with the optical component type identification signals provided by the identification transceiver of the central office.

26. The central office according to claim 25,
wherein the data transceivers of the central office are connected to a demultiplexing unit operable to demultiplex the received optical data signals received via an optical fiber being connected to an optical extraction filter which is operable to extract optical component type identification signals looped back by optical identification filter units associated with components of the optical fiber transmission system to the central office.

* * * * *